Dec. 8, 1970    J. J. STELMACH    3,545,118
ICE FISHING EQUIPMENT
Filed Sept. 9, 1968    2 Sheets-Sheet 1
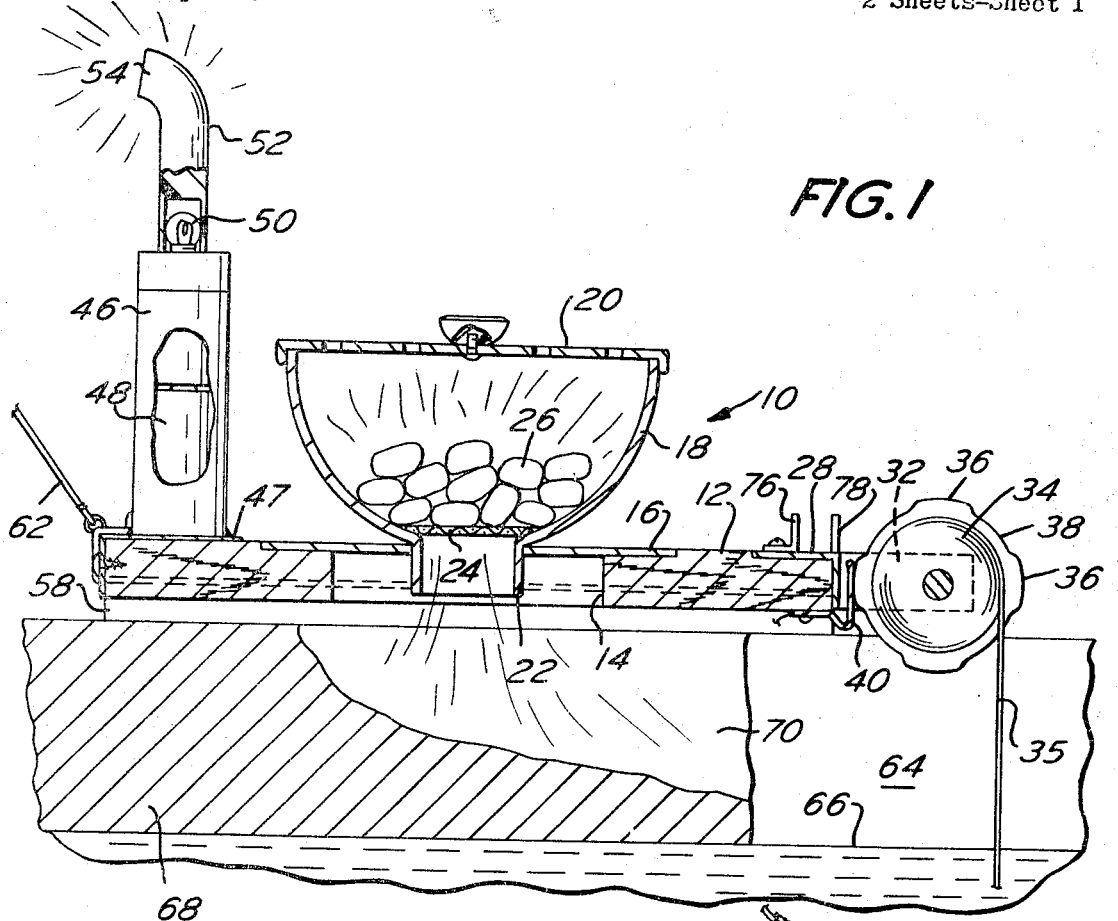
FIG. 1
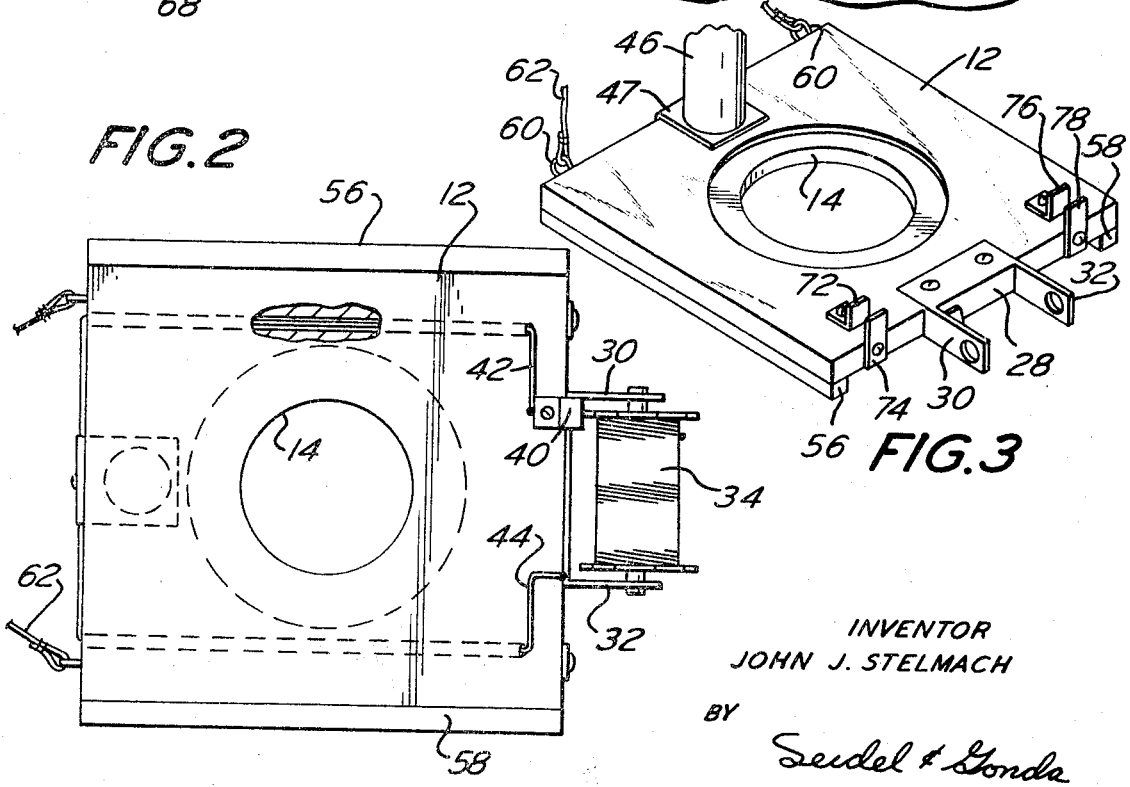
FIG. 2
FIG. 3
INVENTOR
JOHN J. STELMACH
BY
Seidel & Gonda
ATTORNEYS.

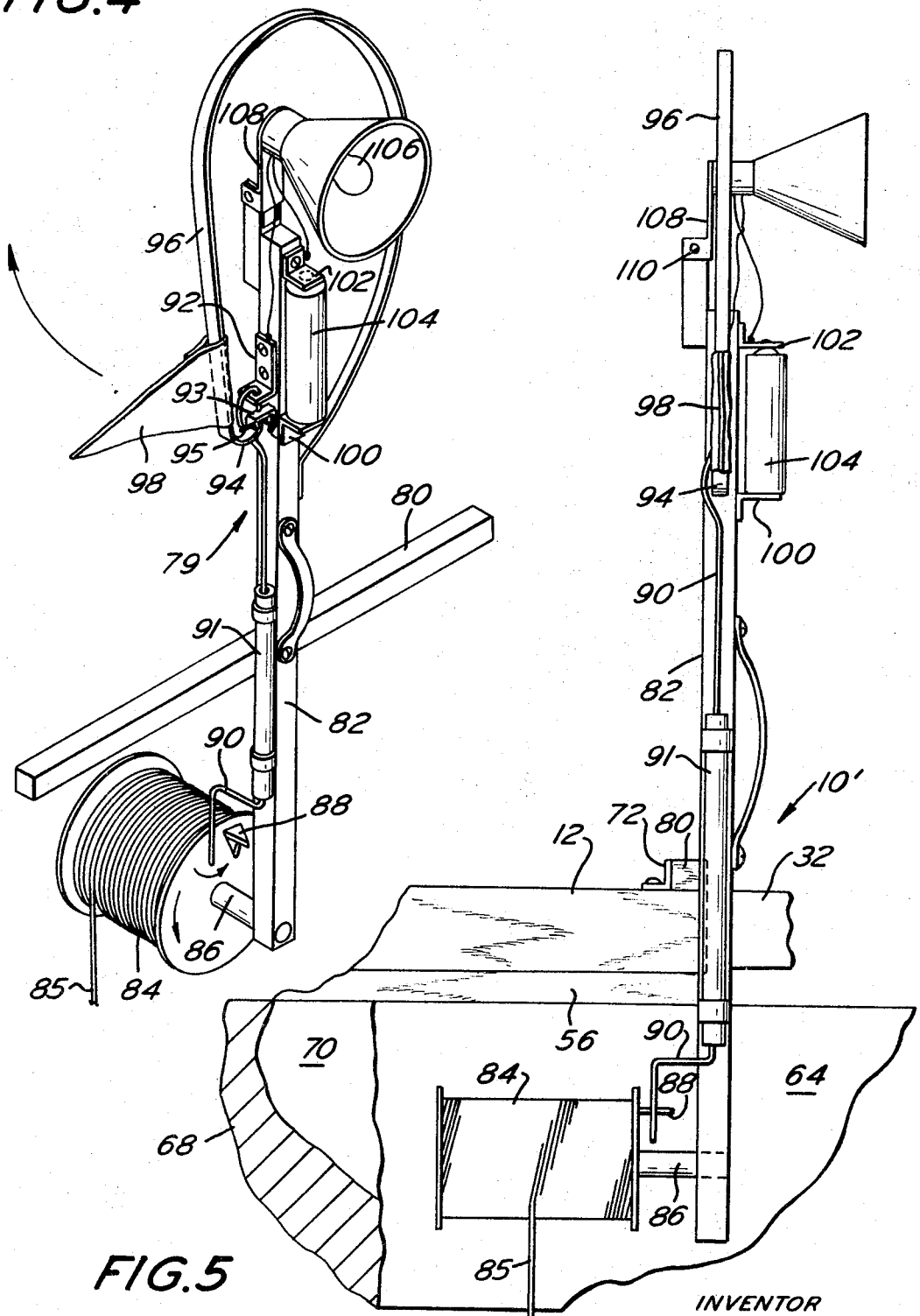

United States Patent Office 3,545,118
Patented Dec. 8, 1970

3,545,118
ICE FISHING EQUIPMENT
John J. Stelmach, 1621 Dounton St.,
Philadelphia, Pa. 19140
Filed Sept. 9, 1968, Ser. No. 758,547
Int. Cl. A01k 97/12
U.S. Cl. 43—17                    9 Claims

ABSTRACT OF THE DISCLOSURE

The ice fishing equipment includes a flat substrate having a hole therethrough. A heating means is supported by the substrate for directing heat downwardly through the hole for melting ice below the substrate. A reel is removably supported by the substrate. A visual indicator supported by the substrate is responsive to rotation of the reel.

---

This invention relates to ice fishing equipment, more particularly to fishing equipment which is adapted for use in fishing through a hole in ice. When fishing through a hole in ice, in sub-zero temperatures there is a likelihood of the water freezing within the hole. Heretofore, solutions proposed for solving this problem included providing a housing which extends around the hole and supported by the ice. For example, see U.S. Pat. 2,883,784 and 3,230,- 655. The solution proposed by the above-mentioned patents necessarily requires the housing to be of larger configuration than the hole in the ice. This is a serious handicap. Further, I have found the solution of a housing which overlies the entire hole to be inadequate for preventing the water from freezing in the hole, especially in sub-zero temperatures.

In accordance with the present invention, there is provided a flat substrate having a hole therethrough, and a heater means supported by and above the substrate. The heater means is positioned so as to direct its heat downwardly through the hole in the substrate for melting ice below the substrate. The ice melted by this heat forms a cavity contiguous with the hole in the ice and constantly feeds water, formed by melting the ice, to the ice hole to prevent the hole from freezing. A reel is supported by the substrate. An indicator on the substrate is responsive to rotation of the reel to thereby indicate that there is a bite on the line.

The substrate is preferably provided with runners so that it will be raised from the surface of the ice. The runners facilitate pulling the substrate along the ice when moving from one hole to another. Further, the space between the runners provides an access path for air to the heater means.

It is an object of the present invention to provide a novel ice fishing equipment.

It is another object of the present invention to provide ice fishing equipment which may be utilized in conjunction with a hole in ice of any size and still prevent the water in the hole adjacent to the equipment from freezing.

It is another object of the present invention to provide ice fishing equipment which includes a flat substrate having a heater means for constantly feeding melted ice to the hole through which a line supported by the substrate extends.

It is another object of the present invention to provide ice fishing equipment including a substrate adapted to support a variety of different known types of indicators.

It is still another object of the present invention to provide ice fishing equipment which is simple, inexpensive, and reliable.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a side elevation view of the ice fishing equipment of the present invention, partly in section, mounted in an operative position adjacent a hole in ice.

FIG. 2 is a bottom plan view of the ice fishing equipment shown in FIG. 1.

FIG. 3 is a perspective view of the ice fishing equipment shown in FIG. 1.

FIG. 4 is a perspective view of an alternative indicator which may be utilized for the equipment shown in FIG. 1.

FIG. 5 is a side elevation view, partly in section, showing the indicator of FIG. 4 mounted on the substrate of FIG. 1.

Referring to the drawing in detail, wherein like numerals indicate like elements, there is shown in FIG. 1 ice fishing equipment in accordance with the present invention designated generally as 10. The equipment 10 includes a flat substrate 12 which may be made from any suitable material such as wood. As shown more clearly in FIGS. 2 and 3, the substrate 12 is rectangular. Other shapes may be utilized as desired.

The substrate 12 is provided with a centrally disposed hole 14 therethrough. The upper surface of substrate 12 is provided with a counterbore concentric with the hole 14. A metal or asbestos plate 16 lies in the counterbore flush with the upper surface of substrate 12.

A heater means is supported by the plate 16. The heater means may assume a wide variety of forms. A can of Sterno may be used for the heater means. For simplicity of illustration and for minimizing the cost, the heater means may be a charcoal burner including a housing 18 having a removable perforated cover 20. Housing 18 is provided with a cylindrical extension 22 which extends through a central hole in the plate 16. The upper end of the opening defined by the cylindrical extension 22 is covered by a screen 24. Charcoal 26 is disposed within the housing 18.

As shown more clearly in FIG. 3, a bracket 28 is fixedly secured to one end of the substrate 12 which is adapted to extend over the hole in the ice. Bracket 28 is provided with arms 30 and 32. Arms 30 and 32 removably support a reel 34 in any convenient manner. While the arms may be provided with a bayonet slot for supporting the reel 34, in the illustrated embodiment the arms are sufficiently flexible so that they may move toward and away from each other to facilitate mounting the reel thereon.

The reel 34 includes a flange at one end providing lobes 36 and valleys 38. The lobes 36 are adapted to engage a contact 40 on the substrate 12. Contact 40 is connected to one end of a conductor 42. The other end of conductor 42 is connected to a flashlight casing 46 mounted on bracket 47.

Bracket 28 is connected to one end of conductor 44. The other end of conductor 44 is connected to batteries disposed in series within casing 46. A lamp 50 bridges the batteries and the casing 46. An indicator extension 52 has a cavity at one end for receiving the lamp 50. The peripheral surface of extension 52 is opaque except for an end face 54. Extension 52 is made from a light transmitting polymeric plastic material such as an acrylic. Extension 52 may be rotated to any desired position so that the face 54 extends in the desired direction.

The substrate 12 is provided with spaced parallel runners 56 and 58 which extend along the length of the substrate on the side edges thereof. The runners 56 and 58 space the lower surface of substrate 12 from the upper surface on the ice. As a result thereof, air may be in direct communication with the cylindrical extension 22 to supply the necessary air required for the burner.

Hooks 60 are attached to the end of the substrate 12 remote from the bracket 28. A flexible member 62, such as string or wire, interconnects the hooks. The flexible member 62 may be utilized to pull the substrate from one ice hole to another. When the substrate 12 is pulled, it rides on the runners 56 and 58.

The equipment 10 is utilized as follows:

A hole 64 is formed in the ice 68 in any convenient manner so as to expose the water 66. The equipment 10 is positioned as illustrated in FIG. 1 with the reel 34 overlying the hole 64. The line 35 is baited and fed into the water 66. The extension 52 is rotated to the desired position whereby face 54 can be observed from a distance such as a cabin or other location wherein the fisherman is located. Thus, the equipment 10 may be unattended during use.

The charcoal 26 is lit. As the charcoal 26 burns, the heat is directed downwardly through the cylindrical extension 22 so as to melt the ice therebelow and form the cavity 70. Cavity 70 is contiguous with the hole 54. As the cavity 70 is formed, the melted water is continuously fed into the hole 64 to prevent the water from freezing in the hole. I have found that at temperatures of 7° below zero the cavity 70 will have a depth of about five inches after a period of several hours and the water 66 will remain unfrozen within the hole 64.

The housing 18 is not in direct contact with the substrate 12. Plate 16 prevents the direct heat transmission in any suitable manner so as to prevent the substrate 12 from becoming heated to the extent that it melts the ice directly. After several hours of operation, the size of the cavity 70 still has not spread so as to cause the equipment 10 to tilt. That is, the runners 56 and 58 will always be supported by the ice 68.

When a fish has taken the bait on line 35, it will cause the reel 34 to rotate. As the reel 34 rotates, the lobes 36 repetitively engage the contact 40 thereby completing a circuit to the lamp 50. The light from lamp 50 is projected through the extension 52 to the face 54. Hence, there will be a blinking light observable at face 54. When it is desired to move to another ice hole, it is only necessary to remove the reel 34 and pull the equipment 10 by grasping the flexible member 62.

In FIG. 4, there is illustrated a visual indicator designated generally as 79 which may be substituted for the visual indicator described above by elements 46–54. Indicator 79 is adapted to be mounted on substrate 12 and includes a horizontal bar 80 pivotably connected to a vertical bar 82. Bar 80 is adapted to be supported on the upper surface of substrate 12 by means of brackets 72, 74, 76 and 78. See FIGS. 3 and 5.

In FIG. 5, there is illustrated ice fishing equipment designated generally as 10' and identical with ice fishing equipment 10 except as will be made clear hereinafter. Ice fishing equipment 10' utilizes the indicator 79. Thus, equipment 10 may be converted to equipment 10' by removing the reel 34 and the indicator described above. In place thereof, the indicator 79 is utilized.

A reel 84 is mounted on indicator 79 and thereby supported by substrate 12. Thus, reel 84 is rotatably supported on a shaft 86 at the lower end of bar 82. A line 85 extends around a reel 84. An actuator portion 88 is struck out of the flange at one end of the reel 84 for performing the function of lobe 36 on reel 34. Actuator portion 88 is adapted to engage the lower end of a rod 90.

The rod 90 has a bent portion at its lower end, a straight portion rotatably supported by sleeve 91 on bar 82, and a hook portion at its upper end. The hook portion at the upper end of the rod 90 rotatably engages one leg of a bracket 92. Bracket 92 is attached to the bar 82.

A bracket 93 is attached to the bar 82 below bracket 92. A flag pole 96 formed of resilient metal has one end secured to bar 82. The flag pole is bent as shown more clearly in FIG. 4 so that a hook 94 at its other end is releasably engaged by the bracket 93 and thereby prevents it from assuming an extended position. Flag pole 96 has a flag 98 mounted thereon.

A battery 104 is supported at the upper end of bar 82 by means of brackets 100 and 102. Bracket 102 is electrically coupled to a lamp 106. Lamp 106 is pivotably secured to the upper end of bar 82 by means of a bracket 108. Bracket 108 is adapted to be manually manipulated about the axis of pin 100.

When a fish has taken the bait on line 85, it causes the reel 84 to rotate. Rotation of the reel 84 causes the actuator portion 88 to engage the lower end of the rod 90 and cause the rod 90 to rotate about the axis of sleeve 91. As rod 90 rotates, the hook portion at its upper end pushes the hook 94 on flag pole 86 sideways until it is no longer restrained by the bracket 93. Thereafter, the flag pole assumes an extended position.

When the hook portion at the upper end of rod 90 has rotated to a sufficient degree to push the hook 94 sideways, it engages the contact 95 on bracket 93. Brackets 100 and 93 are electrically coupled together. The contact 95 is electrically coupled to the bracket 92 by means of the hook portion at the upper end of rod 90. Bracket 92 is electrically coupled to the lamp 106. Hence, engagement of contact 95 by a portion of rod 90 completes an electrical circuit to the lamp 106. Thus, equipment 10' includes two visual indicators removably mounted as a unit on the substrate 12. Equipment 10' is otherwise identical with equipment 10 as described above and is utilized in the same manner.

The present invention may be embodied in other specific forms without departing from the spirit or essential attributes thereof and, accordingly, reference should be made to the appended claims, rather than to the foregoing specification as indicating the scope of the invention.

I claim:

1. Ice fishing apparatus comprising a flat substrate having a hole therethrough, means for generating heat on said substrate and directing the heat downwardly through the hole in the substrate for melting ice below a portion of the substrate, said heater means including a pot for burning charcoal, said pot having a tubular extension extending into said hole and spaced radially inwardly from a periphery of said hole, a reel supported by said substrate, and an indicator supported by said substrate, said indicator being responsive to rotation of the reel to thereby indicate that a fish has taken the bait on the line of the reel.

2. Ice fishing equipment in accordance with claim 1 including runners projecting downwardly from side edges of the substrate.

3. Ice fishing equipment in accordance with claim 1 wherein said substrate is made from wood, and said reel being supported by the substrate adjacent a side edge of the substrate.

4. Ice fishing equipment in accordance with claim 1 wherein said reel is supported from said substrate by said indicator, said indicator including a flag attached to one end of a flag pole.

5. Ice fishing equipment in accordance with claim 4 wherein said reel is supported at the lower end of said indicator at a location below the plane of said substrate.

6. Ice fishing equipment in accordance with claim 5 including means connected to said substrate for pulling said substrate, said pulling means including a flexible member at least one end of which is attached to said substrate.

7. Ice fishing equipment in accordance with claim 1 wherein said indicator includes a lamp supported by said substrate, a light transmitting extension receiving said lamp, said extension being coated with an opaque material except for a face of the extension whereby light from the lamp may be observed at said face.

8. Ice fishing apparatus comprising means for resting on ice without embracing or circumscribing a hole in ice, said means comprising a flat substrate having a hole therethrough, means on said substrate for generating heat and generating the heat downwardly through a hole in the substrate for melting ice below a portion of the substrate and thereby feed melted ice to the ice hole, a reel and a cooperating electrical contact supported by said substrate, an indicator supported by said substrate, electrical conductors supported by the substrate and interconnecting said contact with said indicator, said contact completing an electrical circuit through said conductors to said indicator in response to rotation of the reel whereby said indicator will indicate that a fish has taken the bait on the line of the reel.

9. Apparatus in accordance with claim 8 wherein said indicator and reel are supported by the substrate at opposite ends thereof, said means for generating heat being disposed between said reel and said indicator.

References Cited

UNITED STATES PATENTS

| | | | |
|---|---|---|---|
| 2,654,176 | 10/1953 | Kachelski et al. | 43—17 |
| 2,741,054 | 4/1956 | Brundage | 43—17 |
| 2,747,569 | 5/1956 | Holm et al. | 126—271.3X |
| 2,785,493 | 3/1957 | Thiel | 43—17 |
| 2,883,784 | 4/1959 | Obernolte | 43—4 |
| 3,134,186 | 5/1964 | Krueger | 43—17 |
| 3,170,458 | 2/1965 | Anderlie | 126—271.3 |
| 3,387,401 | 6/1968 | Stelmach | 43—17 |

SAMUEL KOREN, Primary Examiner

D. J. LEACH, Assistant Examiner

U.S. Cl. X.R.

126—271.3